Patented Dec. 17, 1940

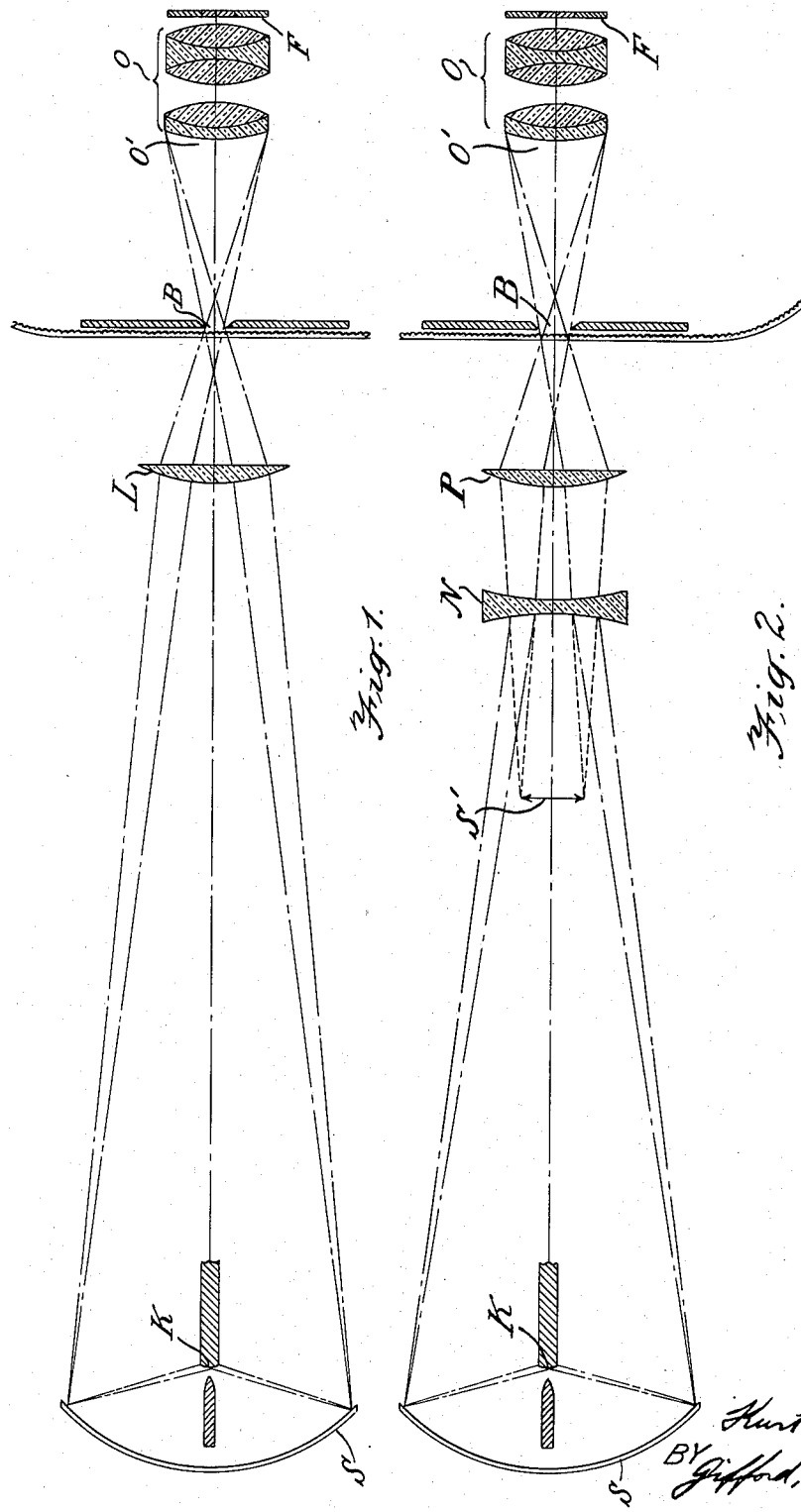

2,225,485

UNITED STATES PATENT OFFICE 2,225,485

PROJECTOR CONDENSER SYSTEM

Kurt Räntsch, Jena, Germany, assignor, by mesne assignments, to Kislyn Corporation, New York, N. Y., a corporation of Delaware Application July 17, 1937, Serial No. 154,146
In Germany July 22, 1936

1 Claim. (Cl. 88—24)

This invention relates to a novel and improved form of projector condenser system.

It is already known that in the projection of cinematographic films, the light source is usually imaged in the film aperture. It is therefore advantageous to insert a field lens or collimating lens in the film aperture which images the condenser or the concave mirror of a mirror arc in the objective. The use of such a field lens is advantageous in the projection of flat films in order to use fully as possible the light which falls on the film. In the projection of lenticular film according to the prior art, it is absolutely necessary to use such a lens or the light passing through the lenticulations on the edge of the film does not completely reach the objective so that only a portion of the picture lying under the lenticulations is used.

The field lens placed in the film aperture does not share materially in imaging the light source upon the film. Neither does it have any influence upon the aperture of the light beam, so that the illuminating apparatus must be of exactly the required aperture necessary for the illumination of the objective. For example, should the objective be changed to one of another aperture it is not possible to use it without an alteration of the entire lighting system.

According to the invention, a special optical system is placed between the film aperture and the condenser or the concave mirror, if it is a mirror arc, which will determine the aperture angle of the light which falls on the film and produces a combination which is both an auxiliary condenser and a field lens. A special field lens is then no longer necessary.

Through this new lens system, an essential advantage is attained over the previous use of a simple field lens. It is often necessary to cool the film in the picture aperture by the direct application of an air blast. Such a method of cooling can only be used if the picture aperture is accessible from both sides. But a field lens placed close to the film renders it impossible to use an air blast for cooling. A further disadvantage of a field lens close to the film is the difficulty of avoiding accumulations of dust. Every foreign particle present on the lens is imaged along with the film and is enlarged upon the picture screen.

The invention will be better understood by reference to the accompanying drawing in which:

Fig. 1 is a diagrammatic view lengthwise of an optical system having my invention applied thereto;

Fig. 2 is a view similar to Fig. 1 but showing a different form of the invention.

In both figures, for the purposes of illustration, it is assumed that the condenser system is in the form of a concave mirror, since the invention is particularly useful in connection with a mirror acting as a condenser to direct a beam of light through the film aperture, although the invention may be used also where the condenser system comprises an arrangement of lenses usually referred to as a condenser.

Fig. 1 shows a mirror arc in which the crater K of the positive carbon images upon the lenticulated film shown in the picture aperture or film gate B by means of the concave mirror S and the auxiliary condenser lens L according to the invention. The light rays pass into the entrance pupil O' of the objective O, in which pupil the lens L images the mirror S. Associated with the objective O is a color filter F of known form, usually comprising zones of green, red, and blue. The film is so placed that its lenticulations face the filter F. In the working example according to Fig. 1 the necessary aperture 1:2 is attained. The size of the entrance pupil is therefore a half of its distance from the picture aperture B.

The lens L enlarges the aperture from that attained by the mirror to a value of 1:2. Without the auxiliary lens, the illumination would only attain the insufficient aperture of 1:4. The position and the focal length of the lens L are therefore so chosen that the mirror S is imaged in the entrance pupil of the objective O. Even if no field lens is provided in the picture aperture, the exact light path required exists between the picture aperture and the objective.

In Fig. 2 an illuminating system is represented in which an aperture of 1:3 is shown. In order to utilize all of the light rays emitted by the mirror, it is necessary to give it a considerably greater distance from the picture aperture, especially the lens L. Such a decided increase in the constructional length of the illuminating system is often undesirable. According to my further invention, I do not use a single auxiliary lens but provide a telephoto system between the mirror and the picture aperture. This system, in which the negative lens is placed preferably toward the light source and the positive lens towards the picture aperture, enables us to encompass all optical and constructional requirements.

In Fig. 2, K again indicates the light source, S the mirror, B the picture aperture, and O the objective, the size of the pupil of which is one-third of its distance from the film.

As indicated in Fig. 2, the rays passing out to the negative lens N of the telephoto system, form a virtual image of the mirror S in the position indicated by S'. This virtual image is then formed in the entrance pupil of the objective O by the positive lens P, since the focal lengths of the single lens elements have been so chosen that there is a simultaneous imaging of the light source K in the picture aperture B. The values of the refractive indexes of the auxiliary telephoto system lens elements are determined by the above conditions. For example, it might be necessary not to obstruct a position between the auxiliary lenses and the picture aperture, because this position is occupied by the shutter. It is also important to take into account the dimensions of the mirror used in the apparatus and especially the minimum distance imposed by the lamp and by the lamp house as well as the problem of space which limits the maximum distance. It is therefore advisable to calculate the light path from the side of the objective pupil backwards. For example, if the size and distance of the entrance pupil from the picture aperture and the size and position of the concave mirror are given, then the value of the simple positive lens position and the refractive index of the auxiliary lens are easily determined. There is then only the position of the light source in reference to the mirror to be calculated so that imaging of the light source, through the mirror and the auxiliary lens system, is produced in the picture aperture.

Using a telephoto system according to the invention, there is a certain flexibility for the value of the necessary refractive indexes. Still it is necessary that the positive lens which is turned toward the picture aperture, should form an image of the virtual image S' of the concave mirror produced by the negative lens, into the entrance pupil of the objective without any substantial deviation. Such a lens system may be as follows:

Diameter of entrance pupil _____ 67 mm.
Distance of pupil from picture aperture _____ 200 mm.
Diameter of mirror 300 mm. focal length equals _____ 112 mm.
Distance from mirror to picture aperture _____ 1200 mm.
Positive lens, focal length equals 75 mm., 150 mm. to the picture aperture.
Negative lens, focal length equals 225 mm., 300 mm. to the picture aperture.

The auxiliary lenses between the concave mirror and the picture aperture can consist of several elements in order to obtain the simultaneous imaging of the light source in the picture aperture and of the mirror in the objective pupil.

With the lens systems shown in Figs. 1 and 2, a mirror arc lamp is provided which is especially adapted to utilize the light emanating from the light source to the fullest capacity. It is also possible to use a condenser arc instead of a mirror arc with the same sort of auxiliary lens system so that a light source emitting bundles of rays at a narrow aperture angle, can be altered to use the light at a wide aperture angle of predetermined value.

While the invention is shown as embodied in specific forms, it is to be understood that various changes in details may be made without departing from the scope of the invention, as defined by the appended claim.

What is claimed is:

A projection system comprising a light source, a film gate, a condenser system adapted to project light from said source through said gate, an objective disposed on the opposite side of said gate from said light source and adapted to receive light projected through said gate by said system, a color filter associated with said objective and in the optical axis of the system, a lenticulated film in said film gate and having its lenticulations facing said filter, and an auxiliary optical device disposed between the condenser system and the film gate and comprising lenses constructed and arranged to form an image of the source of light in said film gate and also to form an image of the condenser system in the entrance pupil of said objective, said optical device comprising a telephoto system having negative and positive elements, with the negative element facing towards the condenser system and the positive element towards the film gate or the objective.

KURT RÄNTSCH.